United States Patent [19]

Nichols

[11] Patent Number: 4,736,386
[45] Date of Patent: Apr. 5, 1988

[54] CARRIER OUT-OF-LOCK DETECTOR APPARATUS

[75] Inventor: Richard A. Nichols, Richardson, Tex.

[73] Assignee: Rockwell International Corporation, El Segundo, Calif.

[21] Appl. No.: 35,120

[22] Filed: Apr. 6, 1987

[51] Int. Cl.$^4$ .............................................. H03D 3/02
[52] U.S. Cl. ...................................... 375/10; 329/50; 329/111; 375/81; 375/120
[58] Field of Search ...................... 375/10, 81, 120, 39; 329/50, 111, 122, 124, 109; 307/443, 463, 471

[56] References Cited

U.S. PATENT DOCUMENTS

| | | | |
|---|---|---|---|
| 4,458,356 | 7/1984 | Toy | 375/81 |
| 4,466,109 | 8/1984 | Sari | 375/39 |
| 4,534,036 | 8/1985 | Betts et al. | 329/111 |
| 4,687,999 | 8/1987 | Desperben | 329/124 |

Primary Examiner—Benedict V. Safourek
Attorney, Agent, or Firm—Bruce C. Lutz; V. L. Sewell; H. Fredrick Hamann

[57] ABSTRACT

A logic circuit for detecting when the sign and most significant error bit of the digital values defining the data vector for either the In-phase or quadrature-phase have identical logic values. As illustrated, a pair of counters is used to provide an integrator with one of the counters receiving all error indications and the other receiving "good" indications and an output is provided when one of the counters first reaches a full count condition. Thus, the integrator provides an out-of-lock condition when there is an error indicative condition for more than half of a predetermined number of counts.

5 Claims, 3 Drawing Sheets

CARRIER OUT-OF-LOCK DETECTOR APPARATUS

THE INVENTION

The present invention is generally concerned with telecommunications, and more specifically concerned with quadrature amplitude modulation communication and detection schemes. Even more specifically, the present invention is concerned with detecting when a demodulator is in a phase locked or out-of-phase locked condition.

BACKGROUND

When using digital techniques in a phase-locked loop of a quadrature amplitude modulated (QAM) communication system, of the type shown and discussed in a U.S. Pat. No. 4,571,550 issued in the name of Manley J. Head and assigned to the same assignee as the present invention, it has been found that when the bit error rate exceeds a given value, some prior art out-of-lock detectors cannot distinguish the difference between in-lock with high bit error rate and out-of-lock conditions for the carrier phase-locked loop.

The present invention utilizes the most significant error bit and the next most significant error bit. Typically, this most significant error bit is called the error "sign" bit. These two bits also define the two most significant bits of lesser value than the data bits used to define the vector space for the data. By utilizing the information from these two bits in a logic array used to actuate an integrator type circuit, such as a counter, the circuit can tell with a high degree of accuracy whether or not the carrier phase-locked loop is out of lock, even in situations where there is a high bit error rate.

It is, therefore, an object of the present invention to provide an improved means for detecting out-of-lock conditions of a phase-locked loop in a QAM system.

Other objects and advantages of the present invention will be apparent from a reading of the specification and appended claims in conjunction with the drawings wherein:

DETAILED DESCRIPTION

Figure 1:
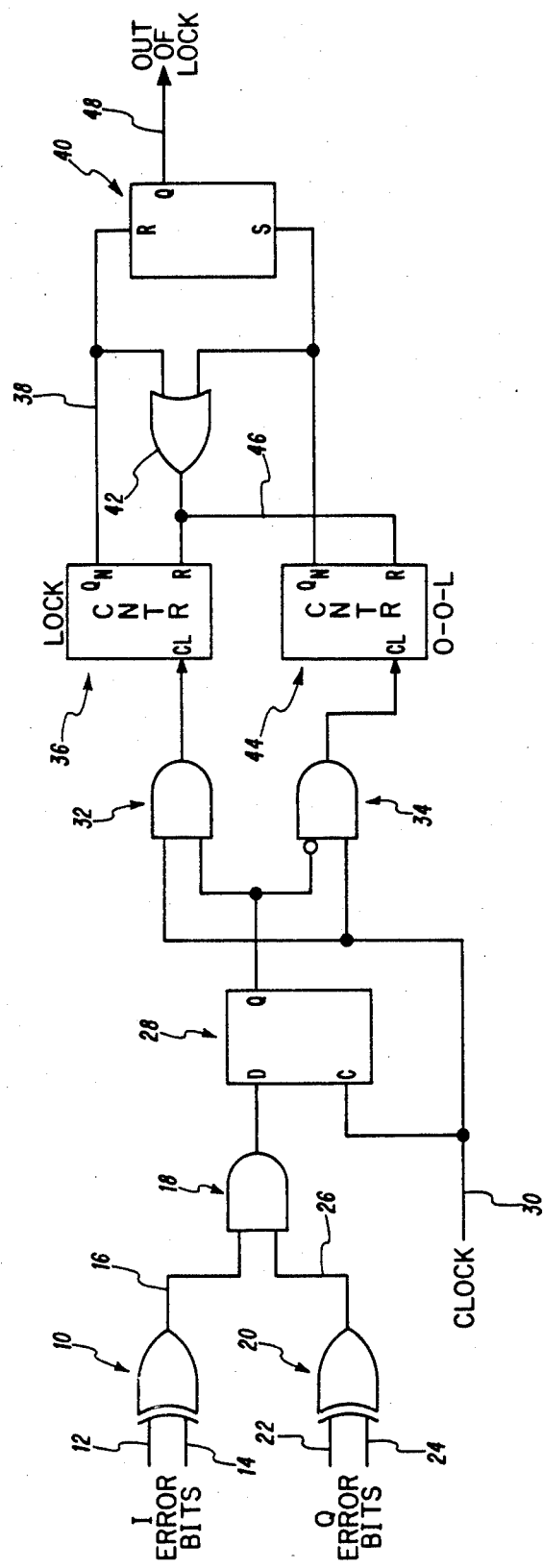
FIG. 1 is a schematic diagram of the circuitry involved in the present invention.

In FIG. 1, a first exclusive OR gate generally designated as 10 has input leads 12 and 14. An output of exclusive OR gate 10 is supplied on a lead 16 to an AND gate generally designated as 18. A second exclusive OR gate generally designated as 20 has input leads 22 and 24. Exclusive OR gate 20 is connected from its output to a second input of AND gate 18 by a lead 26. An output of AND gate 18 is connected to a D input of a D flip-flop generally designated as 28. A clock signal is supplied on a lead 30 to a clock input of the D flip-flop 28 as well as to one input of each AND gates generally designated as 32 and 34. A Q output of D flip-flop 28 is connected to a second input of AND gate 32 and is inverted before it is input to a second input of AND gate 34. An output of AND gate 32 is supplied to a clock input of a counter generally designated as 36 and having a Q output supplied on a lead 38 to a Reset input of a set-reset flip-flop generally designated as 40, as well as to one input of an OR gate 42. An output of AND gate 34 is supplied to a clock input of a second counter generally designated as 44 having a Q output supplied to a Set input of set-reset flip-flop 40, and to a second input of OR gate 42. An output of OR gate 42 is supplied on a lead 46 to a Reset input of each of counters 36 and 44. Finally, a Q output of flip-flop 40 is supplied on an apparatus output lead 48. When lead 48 is in a logic 1 condition, the system is out of lock.

Figure 2:
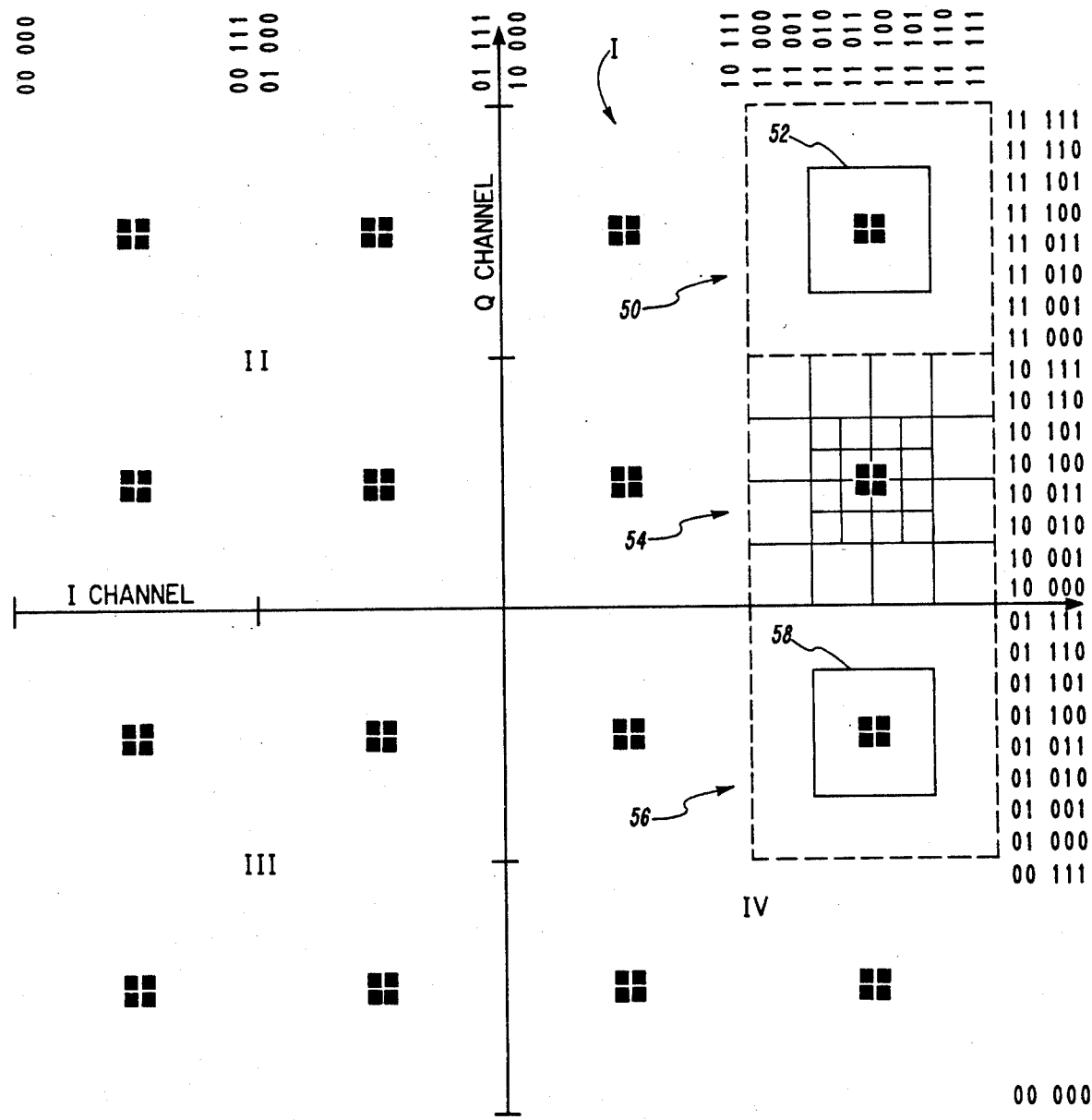
FIG. 2 is a representation of the vector space involved in a 16 QAM system and is used in explaining the operation of the circuit of FIG. 1.

In FIG. 2, a representation is provided of the 16 possible vector positions available in a 16 bit quadrature amplitude modulated system. The horizontal axis is indicated as being the I channel (In-phase) information and, as illustrated, shows five of the six data bits from an analog-to-digital converter, detailing the incremental positions of a detected vector of information. From left to right, the data bit representation of position varies from all logic 0's to all logic 1's. The left two most significant bits represent the data, while the third, fourth and fifth bits are error bits. The middle or third bit is the most significant error bit or error sign bit, and the next bit is the second most significant error bit, and it is these third and fourth bits that are used as inputs to exclusive OR gate 10 of FIG. 1. The vertical axis is the Q channel (quadrature-phase) information, and varies from all logic 0's at the bottom to all logic 1's at the top. Again, the two left most significant bits are data bits, whereas the third and fourth bits are the most and next most significant error bits, and are the source of the bits applied to leads 22 and 24 of exclusive OR gate 20 in FIG. 1.

In FIG. 2, the upper right quadrant is generally referred to as Quadrant I. The upper left quadrant is Quadrant II, while the lower left quadrant is Quadrant III. Finally, the lower right quadrant is Quadrant IV. Within Quadrant I, there are four vector spaces, with a vector space 50 in the upper right hand portion of Quadrant 1 having an outer dash line box defined by the data bits being logic one for both the Q and I channels. Within the vector space 50, a smaller or interior box designated as 52 is represented and defined by the most significant and next most significant error bits being of opposite logic values. The desired location of the data is at the center of box 52. However, if a majority of the bits are merely found within box 52, rather than at the center, the phase-locked loop is still considered to be in phase lock. The detected data points which fall outside the desirable central area, but still within box 52, can be caused by random noise, multipath distortion, etc. If a majority of the detected data falls outside box 52, the phase-locked loop is considered to be in an unlocked or nonacquired condition. Similar boxes may be found in vector spaces designated as 54 and 56. A further interior box is designated as 58 within vector space 56. Such a box can be found within vector space 54 by checking the error bit representations adjacent this box.

The central most location of each vector space represented by four dark squares comprise the desirable detection areas. These positions are defined by a sixth bit not shown since this sixth bit does not form a part of the present invention.

Since a sixth bit is required for detecting out-of-lock in a 256 QAM system, it is desirable to use a common scheme and merely discard the unused error bits in the 16 and 64 QAM systems.

Figure 3:
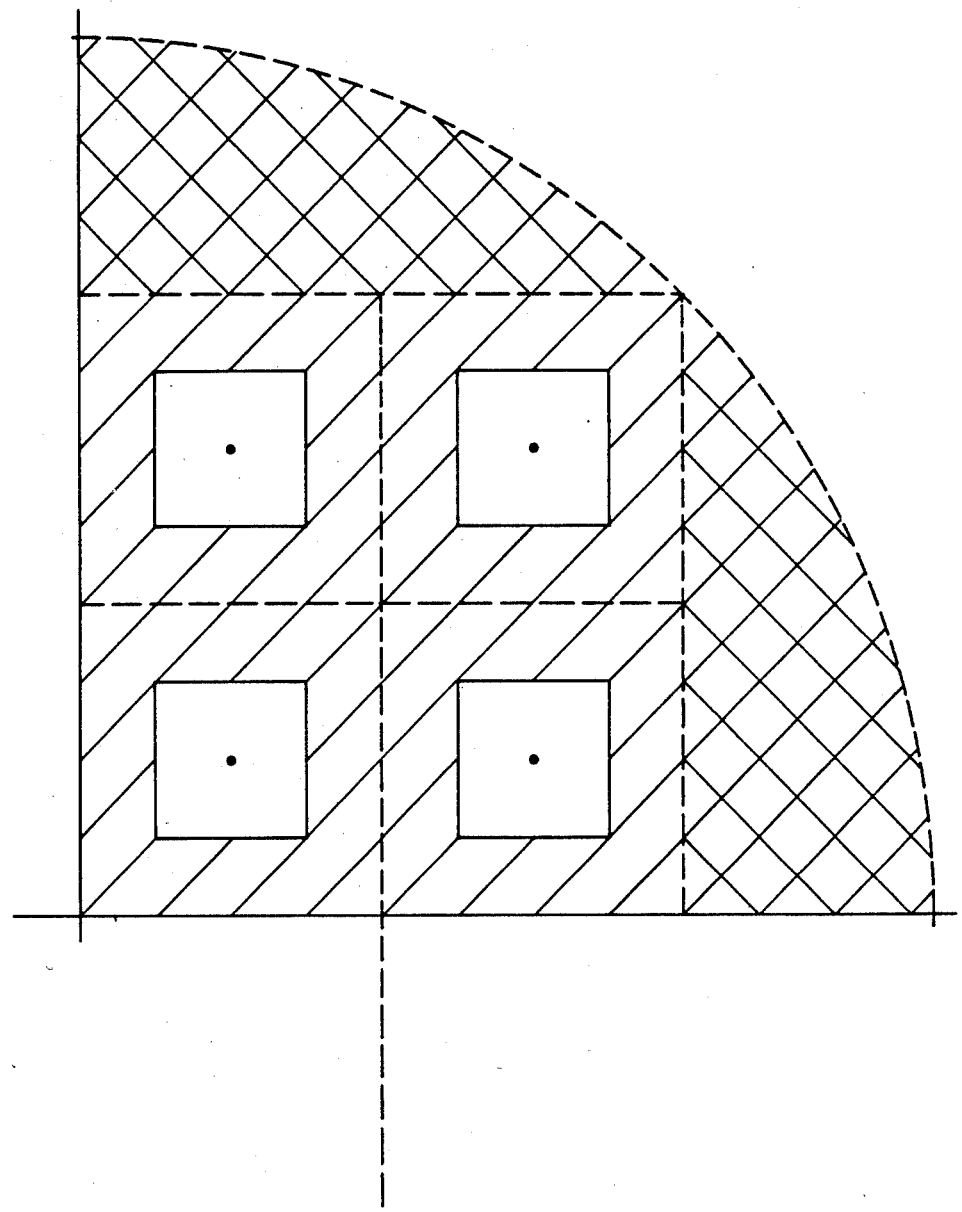
FIG. 3 is a further representation of the vector space to provide additional insight of the operation of the circuit of FIG. 1 when the carrier loop is out-of-lock.

FIG. 3 illustrates the Quadrant I of FIG. 2 in a manner whereby it is much easier to see the different vector spaces. In FIG. 3, the clear space defines the area where the data bits should normally be detected. The single hatched area is the area that defines possible sample locations for high bit-error-rate conditions, and the single plus double hatched areas define possible sample locations for a carrier out-of-lock condition. In the out-of-lock condition, the received vector space rotates around the center (lower left corner of Quadrant I), so vectors will be detected in the double hatched area also.

OPERATION

As previously indicated, if the system is in lock, and there is no noise or distortion included in the detected data, the position detected in the quadrants will be within the area of one of the sixteen dark areas of FIG. 2, such as the center of box 52. Even with noise, if there is a locked condition, a majority of the detected data points will be within the area illustrated by one of the boxes, such as 52 or 58. Within this box, the most significant and next most significant error bits are of opposite sign as may be observed from the digital representations along two sides of the quadrant. If opposite polarity logic value error bits are supplied to the two exclusive OR gates 10 and 20, there will be logic 1 outputs. With both leads 16 and 26 being a logic 1, the AND gate 18 will provide a logic 1 to the D flip-flop 28. Thus, upon the next occurrence of a clock on lead 30, an output will be provided to each of the AND gates 32 and 34. Since the logic 1 from the Q output of D flip-flop 28 is inverted by the inverter input at AND gate 34, the signal will pass only through AND gate 32 and be supplied to the clock input of counter 36.

If the next detected data bit falls outside the space immediately surrounding a desirable position of a data bit, i.e., the single hatched area of FIG. 3, the error bits for the output of one or both of the exclusive OR gates 10 and 20 will be a logic 0. The absence of both logic 1's at the input of AND gate 18 will provide a logic 0 output, thus providing a logic 0 from the output of D flip-flop 28 upon the next occurrence of a clock on lead 30. The logic 0 output will then pass through AND gate 34 rather than AND gate 32 (due to the inverter), and provide an input to counter 44 which is the out-of-lock counter. Whichever one of counters 36 and 44 reaches its maximum count first, will provide an output on the appropriate Q output lead to either the Set or Reset input of set-reset flip-flop 40. If 40 is Set, an output will be provided on lead 48 providing an indication that the system is out of lock. The occurrence of an output from either of the counters 36 or 40 will provide a signal through the OR gate 42 to reset each of the counters to zero so that they can commence again. As will be observed, the AND gates 32 and 34 in combination with the counters 36 and 44 provide the function of an integrator. While the present invention shows completely digital out-of-lock detection means, the inventive concept is in using the error bits to determine the lock or out-of-lock conditions. Analog integrators and a comparator could be used in place of the right hand portion of FIG. 1 if the required bandwidth were so narrow that an extreme amount of integration is required to operate satisfactorily.

Although five data bits were illustrated to show the detection scheme for the analog-to-digital precision, the invention actually used a six bit analog-to-digital converter. The least significant error bits were merely unused. With a six bit analog-to-digital converter, the present approach may be used in a 256 QAM demodulator and still have the required two error bits to operate the present out-of-lock detector. If greater than 256 QAM demodulation is desired, more than six bits must be used to define the vector space position of data in practicing the present invention.

In summary, the present invention attempts to define a lock condition as that condition which returns a digital signal indicating that the majority of detected data is in one of the areas shown as a blank area in FIG. 3. If, on the other hand, the majority of detected data is in any of the single hatched or double hatched areas of FIG. 3, or in reference to FIG. 2, in the area outside the boxes, such as 52 and 58, it is probable that the demodulator is out of lock. The integration techniques of the present invention average the detected data samples to provide an out-of-lock indication only when the majority of data samples fall outside the central area surrounding each ideal vector position.

While I have illustrated a single embodiment of the invention, and have described an alternate implementation using an analog integrator, I wish to be limited not by that specifically discussed above, but only by the scope of the inventive concept as defined in the appended claims.

I claim:

1. Digital phase lock loop out-of-lock detector apparatus comprising, in combination:
   IEsgn first, IEnmsb second, QEsgn third, and QEnmsb fourth signal input means for supplying In-phase error sign and error NMSB (next most significant bit) and quadrature-phase error sign and error NMSB error signals respectively;
   exclusive OR fifth means, including input and output means, connected to said first and second means for receiving In-phase error signals and supplying a logic result at the output thereof;
   exclusive OR sixth means, including input and output means, connected to said third and fourth means for receiving quadrature-phase error signals and supplying a logic result at the output thereof; and
   integration type seventh means, including input and output means, connected to said fifth and sixth means, for supplying an out-of-lock apparatus output signal when both said fifth AND said sixth means provide an indication, for a majority of a given time, that one of their inputs have given logic values.

2. Apparatus as claimed in claim 1 wherein said given logic values are identical logic values.

3. The method of detecting out-of-lock conditions in a QAM (quadrature amplitude modulated) digital phase-lock-loop (PLL) comprising the steps of:
   exclusive-ORing the In-phase error sign and error NMSB (next most significant bit) error signals as detected to provide a first result signal;
   exclusive-ORing the quadrature-phase error sign and error NMSB (next most significant bit) error signals as detected to provide a second result signal;
   detecting the relative time that both said first and second result signals are of a given logic value; and
   providing an output out-of-lock signal when at least one pair of the respective NMSB and sign bits are of like values for more than one-half the time.

4. Apparatus for detecting out-of-lock conditions in a QAM (quadrature amplitude modulated) digital phase-lock-loop (PLL) comprising, in combination:

first means for providing In-phase and quadrature-phase sign and NMSB (next most significant bit) error bit signals;

second means, connected to said first means, for exclusive-ORing the In-phase error sign and error NMSB (next most significant bit) error signals as detected to provide a first result signal;

third means, connected to said first means, for exclusive-ORing the quadrature-phase error sign and error NMSB (next most significant bit) error signals as detected to provide a second result signal;

detecting fourth means, for detecting the relative time that both said first AND second result signals are of a given identical logic value; and fifth means, comprising a part of said fourth means, for providing an output out-of-lock signal when either of the respective NMSB and error sign bits are of identical values for more than one-half the time.

5. Digital phase lock loop out-of-lock detector apparatus comprising, in combination:

IEsgn first, IEnmsb second, QEsgn third, and QEnmsb fourth signal input means for supplying In-phase sign and NMSB (next most significant bit) and quadrature-phase sign and NMSB error signals respectively;

logic fifth means, including input and first and second output means, connected to said first through fourth means for receiving said recited error signals therefrom and supplying an output signal indicative of whether or not either of the quadrature and In-phase signal pair are of identical logic conditions thereby indicating an error of at least a given amount; and logic sixth means, including input and output means and further including first and second counter means, connected to said fifth means for receiving output signals therefrom, actuating one or the other of said first and second counter means used as integrating means, for supplying an out-of-lock apparatus output signal when said fifth means provides an indication that at least one of the In and quadrature phase error signals supplied to said detector apparatus have identical logic values, for a majority of the time.

* * * * *